US010542565B2

(12) United States Patent
Porat

(10) Patent No.: US 10,542,565 B2
(45) Date of Patent: Jan. 21, 2020

(54) CLEAR CHANNEL ASSESSMENT (CCA) LEVELS WITHIN WIRELESS COMMUNICATIONS

(71) Applicant: Avago Technologies International Pte. Limited, Singapore (SG)

(72) Inventor: Ron Porat, San Diego, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

(21) Appl. No.: 15/849,896

(22) Filed: Dec. 21, 2017

(65) Prior Publication Data

US 2018/0115993 A1 Apr. 26, 2018

Related U.S. Application Data

(63) Continuation of application No. 14/950,641, filed on Nov. 24, 2015, now Pat. No. 9,867,214, which is a continuation of application No. 14/183,592, filed on Feb. 19, 2014, now Pat. No. 9,204,451.

(60) Provisional application No. 61/773,743, filed on Mar. 6, 2013, provisional application No. 61/936,137, filed on Feb. 5, 2014.

(51) Int. Cl.
*H04W 74/08* (2009.01)
*H04W 72/04* (2009.01)
*H04W 72/06* (2009.01)

(52) U.S. Cl.
CPC ... *H04W 74/0808* (2013.01); *H04W 72/0493* (2013.01); *H04W 72/06* (2013.01)

(58) Field of Classification Search
CPC ......... H04W 74/0808; H04W 72/0493; H04W 72/06
See application file for complete search history.

(56) References Cited

U.S. PATENT DOCUMENTS

| 9,204,451 B2* | 12/2015 | Porat | H04W 72/0493 |
| 9,867,214 B2* | 1/2018 | Porat | H04W 72/0493 |
| 2009/0262688 A1* | 10/2009 | Tsai | H04L 1/0002 370/329 |

(Continued)

FOREIGN PATENT DOCUMENTS

| CN | 101023688 A | 10/2004 |
| CN | 101558615 A | 12/2006 |
| CN | 102257746 A | 11/2008 |

*Primary Examiner* — Walli Z Butt
(74) *Attorney, Agent, or Firm* — Foley & Lardner LLP

(57) ABSTRACT

A wireless communication device is configured to perform clear channel assessment (CCA) using one or more CCA levels that are selected based on various criteria. The device receives or detects one or more packets on the communication medium, and the device then processes those one or more packets to determine status of one or more channels within one or more frequency bands using the one or more CCA levels. These CCA levels may be selected based on one or more parameters, and different CCA levels may be used at different times, for different channels, etc. Also, different CCA levels may be used to determine the status of different channels, different portions of the frequency spectrum, etc. When at least one channel is determined as being clear and available for usage, the device is configured to support communications with one or more other devices via one or more channels.

20 Claims, 8 Drawing Sheets

(56) References Cited

U.S. PATENT DOCUMENTS

| | | | | |
|---|---|---|---|---|
| 2012/0052900 A1* | 3/2012 | Liu | ................ | H04W 28/0205 |
| | | | | 455/515 |
| 2013/0017794 A1* | 1/2013 | Kloper | ............ | H04W 74/0808 |
| | | | | 455/63.1 |
| 2013/0188506 A1* | 7/2013 | Cheong | ............ | H04W 72/085 |
| | | | | 370/252 |
| 2015/0071211 A1* | 3/2015 | Seok | ................ | H04W 74/04 |
| | | | | 370/329 |

* cited by examiner

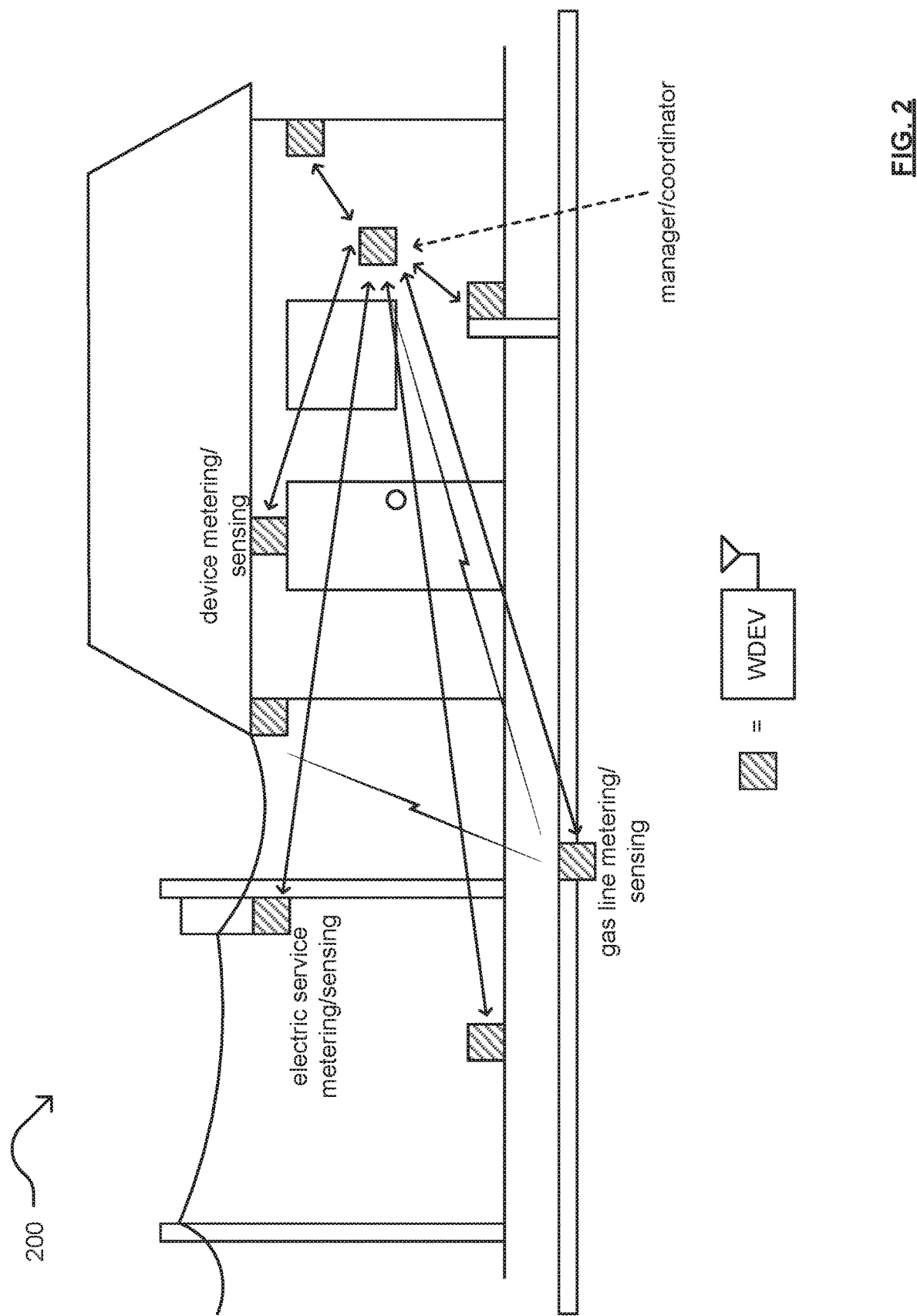

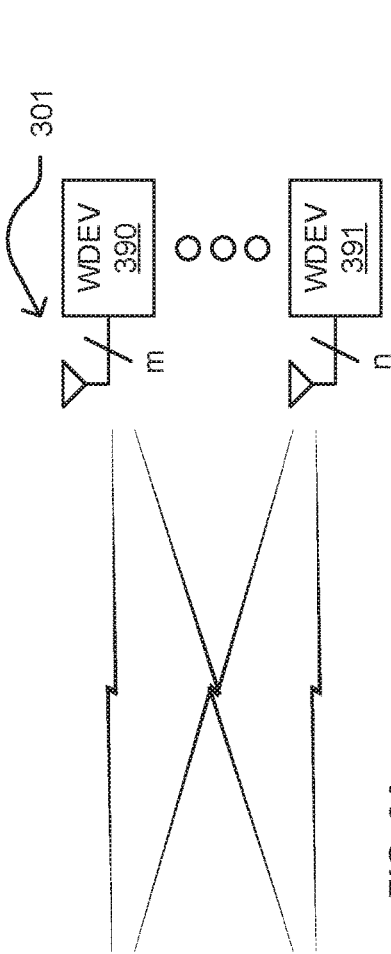
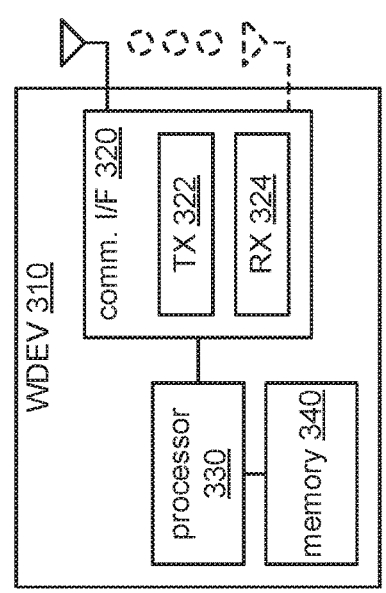
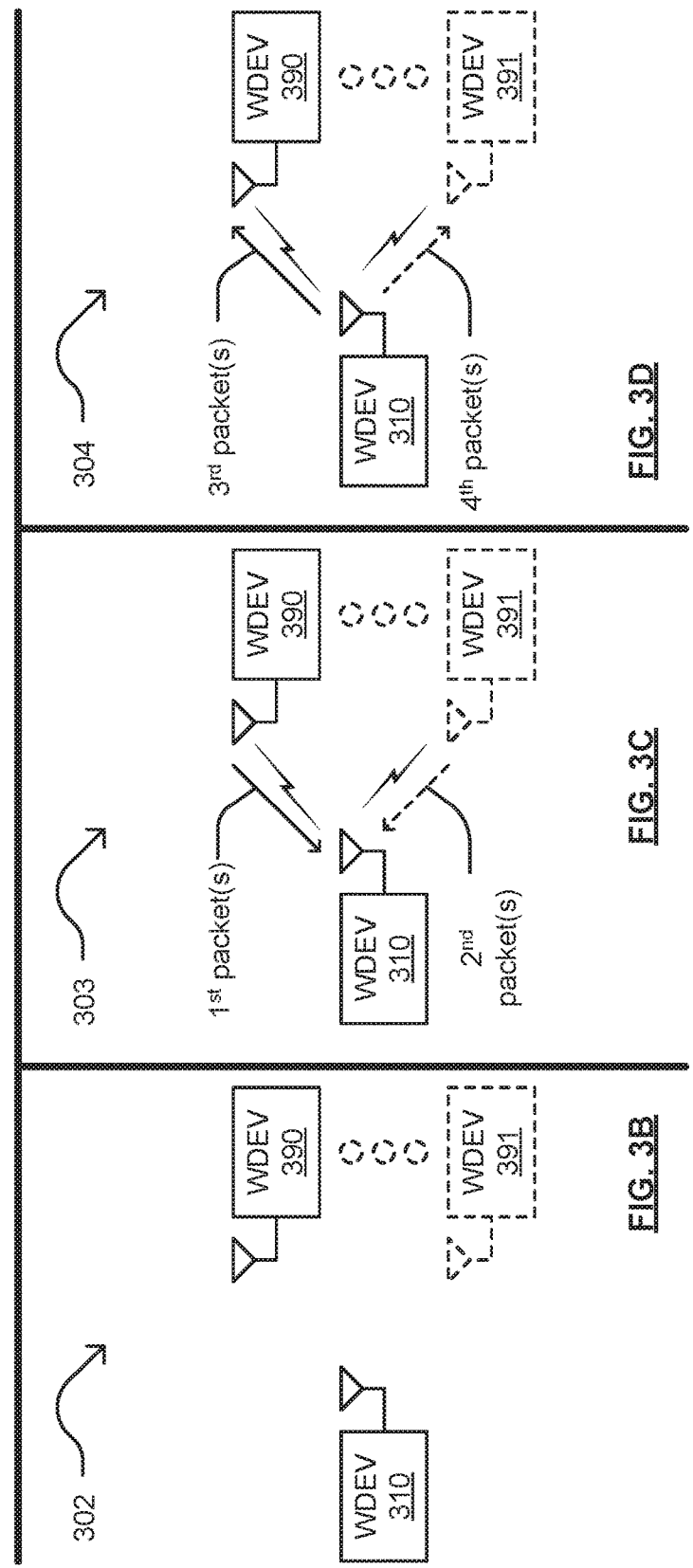
FIG. 3A
FIG. 3B
FIG. 3C
FIG. 3D

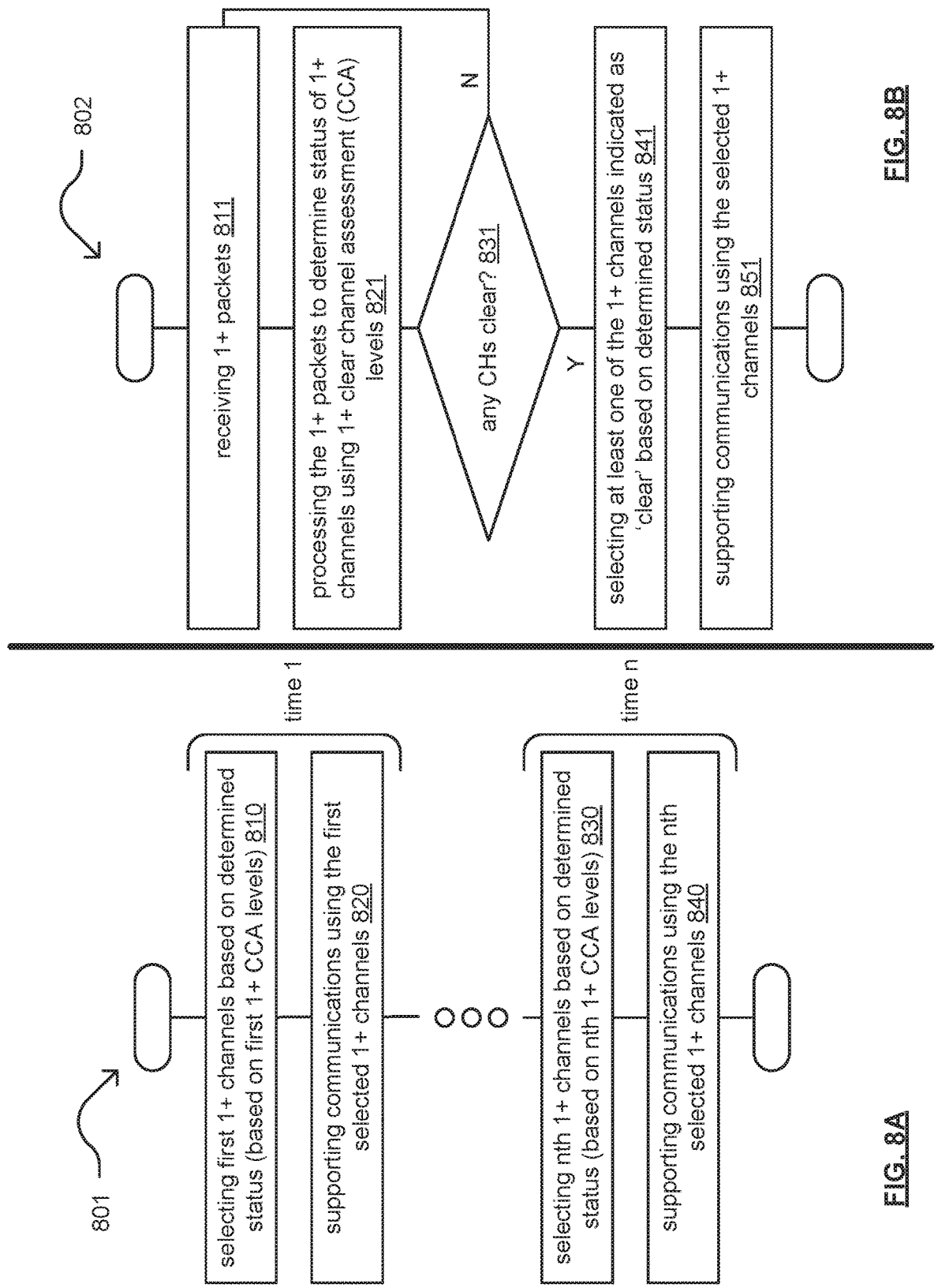

10,542,565 B2

CLEAR CHANNEL ASSESSMENT (CCA) LEVELS WITHIN WIRELESS COMMUNICATIONS

CROSS REFERENCE TO RELATED PATENTS/PATENT APPLICATIONS

The present U.S. Utility Patent Application claims priority pursuant to 35 U.S.C. § 120 as a continuation of U.S. application Ser. No. 14/950,641, entitled "Clear channel assessment (CCA) levels within wireless communications," filed Nov. 24, 2015, pending and scheduled to issue as U.S. Pat. No. 9,867,214 on Jan. 9, 2018, which claims priority pursuant to 35 U.S.C. § 120 as a continuation of U.S. application Ser. No. 14/183,592, entitled "Clear channel assessment (CCA) levels within wireless communications," filed Feb. 19, 2014, now issued as U.S. Pat. No. 9,204,451 on Dec. 1, 2015, which claims priority pursuant to 35 U.S.C. § 119(e) to U.S. Provisional Application No. 61/773,743, entitled "Clear channel assessment (CCA) levels within single user, multiple user, multiple access, and/or MIMO wireless communications," Mar. 6, 2013; and U.S. Provisional Application No. 61/936,137, entitled "Clear channel assessment (CCA) levels within wireless communications," filed Feb. 5, 2014, all of which are hereby incorporated herein by reference in their entirety and made part of the present U.S. Utility Patent Application for all purposes.

BACKGROUND

Technical Field

The present disclosure relates generally to communication systems; and, more particularly, to performing clear channel assessment (CCA) within single user, multiple user, multiple access, and/or MIMO wireless communications.

Description of Related Art

Communication systems support wireless and wire lined communications between wireless and/or wire lined communication devices. The systems can range from national and/or international cellular telephone systems, to the Internet, to point-to-point in-home wireless networks and can operate in accordance with one or more communication standards. For example, wireless communication systems may operate in accordance with one or more standards including, but not limited to, IEEE 802.11x (where x may be various extensions such as a, b, n, g, etc.), Bluetooth, advanced mobile phone services (AMPS), digital AMPS, global system for mobile communications (GSM), etc., and/or variations thereof.

In some instances, wireless communication is made between a transmitter (TX) and receiver (RX) using single-input-single-output (SISO) communication. Another type of wireless communication is single-input-multiple-output (SIMO) in which a single TX processes data into RF signals that are transmitted to a RX that includes two or more antennae and two or more RX paths.

Yet an alternative type of wireless communication is multiple-input-single-output (MISO) in which a TX includes two or more transmission paths that each respectively converts a corresponding portion of baseband signals into RF signals, which are transmitted via corresponding antennae to a RX. Another type of wireless communication is multiple-input-multiple-output (MIMO) in which a TX and RX each respectively includes multiple paths such that a TX parallel processes data using a spatial and time encoding function to produce two or more streams of data and a RX receives the multiple RF signals via multiple RX paths that recapture the streams of data utilizing a spatial and time decoding function.

Clear channel assessment (CCA) is a process performed by a wireless communication device to determine whether or not a transmission may be made on a wireless communication channel. Current practices of performing CCA can result in low and inefficient usage of the wireless communication channel. There continues to be much room for improvement in performing CCA to improve spatial spectral efficiency within wireless communications.

BRIEF DESCRIPTION OF THE SEVERAL VIEWS OF THE DRAWINGS

FIG. 2 is a diagram illustrating an embodiment of a number of wireless communication devices, some operative as smart meter stations (SMSTAs).

FIG. 3A is a diagram illustrating an example of communication between wireless communication devices.

FIG. 3B is a diagram illustrating an example of operation of one or more wireless communication devices.

FIG. 3C is a diagram illustrating another example of operation of one or more wireless communication devices.

FIG. 3D is a diagram illustrating another example of operation of one or more wireless communication devices.

FIG. 8A is a diagram illustrating another embodiment of a method for execution by one or more wireless communication devices.

FIG. 8B is a diagram illustrating another embodiment of a method for execution by one or more wireless communication devices.

DETAILED DESCRIPTION

Figure 1:
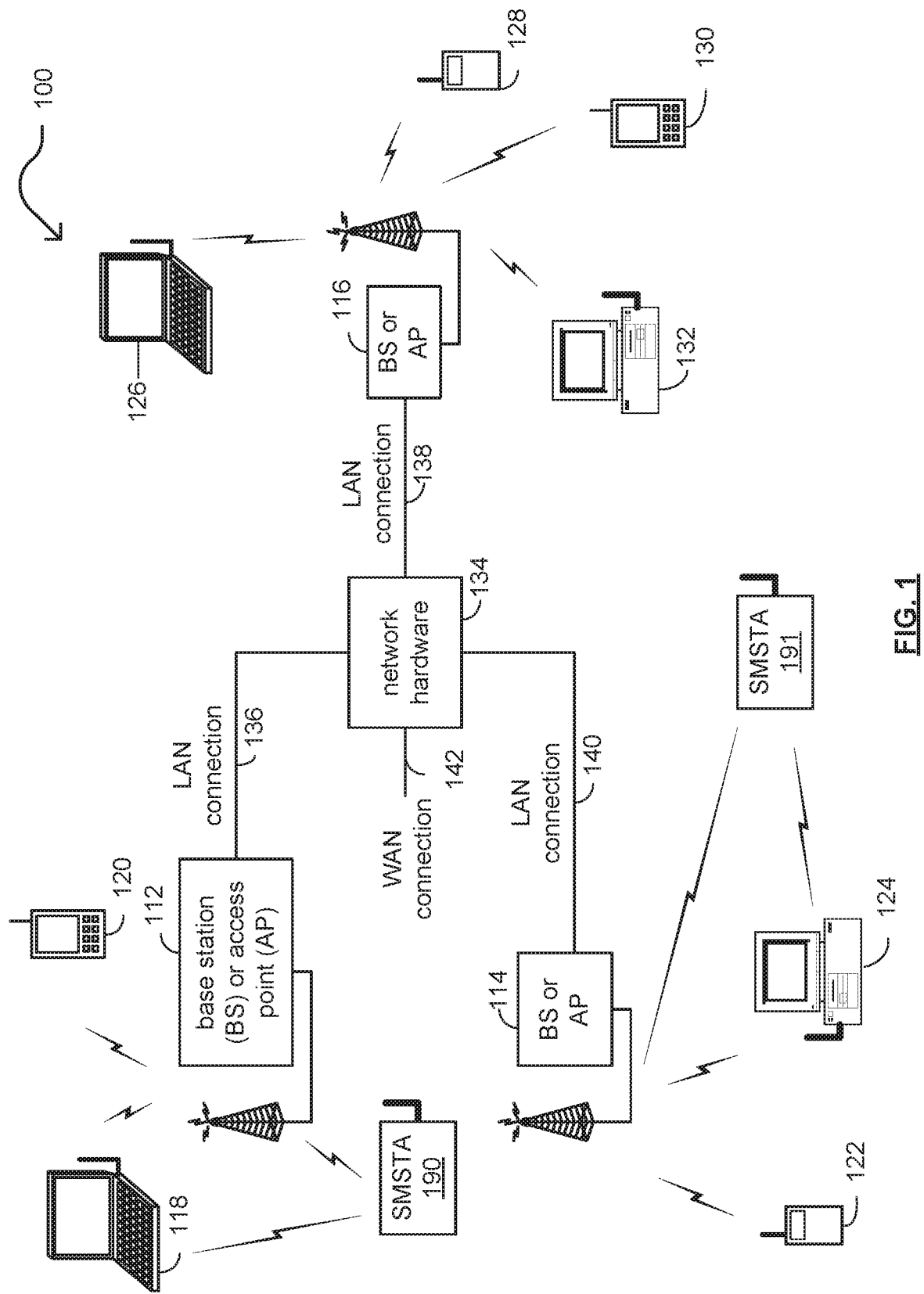
FIG. 1 is a diagram illustrating one or more embodiments of a wireless communication system.

FIG. 1 is a diagram illustrating one or more embodiments of a wireless communication system 100. The wireless communication system 100 includes base stations and/or access points 112-116, wireless communication devices 118-132 (e.g., devices that include wireless stations (STAs) and/or stand-alone wireless stations), smart meter stations (SMSTAs) 190 and 191, and a network hardware component 134. The wireless communication devices 118-132 may be laptop computers, or tablets, 118 and 126, personal digital assistants 120 and 130, personal computers 124 and 132 and/or cellular telephones 122 and 128. The details of an embodiment of such wireless communication devices are described in greater detail with reference to FIG. 2.

The base stations (BSs) or access points (APs) 112-116 are operably coupled to the network hardware 134 via local area network connections 136, 138, and 140. The network hardware 134, which may be a router, switch, bridge, modem, system controller, etc., provides a wide area network connection 142 for the communication system 100. Each of the base stations or access points 112-116 has an associated antenna or antenna array to communicate with the wireless communication devices in its area. Typically, the wireless communication devices register with a particular base station or access point 112-116 to receive services from the communication system 100. For direct connections (i.e., point-to-point communications), wireless communication devices communicate directly via an allocated channel.

Any of the various wireless communication devices (WDEVs) 118-132 and BSs or APs 112-116 may include a processor and a communication interface to support communications with any other of the wireless communication devices 118-132 and BSs or APs 112-116.

In an example of operation, a communication interface implemented within one of the devices (e.g., any one of the WDEVs 118-132 and BSs or APs 112-116) is configured to receive one or more packets and support communications with one or more other devices (e.g., any other of the WDEVs 118-132 and BSs or APs 112-116). A processor implemented within the device (e.g., any one of the WDEVs 118-132 and BSs or APs 112-116) is configured to process the one or more received packets to determine status of one or more channels. The one or more channels may be implemented within one or more predetermined frequency bands. The processor uses one or more clear channel assessment (CCA) levels to determine status of the one or more channels. These CCA levels are selected based on any one or more of various criteria including a number of channels within the one or more channels, one or more bandwidths of those one or more channels, etc. Based on the determined status of the one or more channels, the processor is configured to select at least one of those channels for use in supporting communications with one or more other devices. The processor is also configured selectively to direct when the communication interface supports those communications based on the determined status of one or more channels.

In performing clear channel assessment (CCA), if a wireless communication device can or does receive, detect, or 'hear' a signal above a given level (e.g., a given CCA level), then the wireless communication device generally operates to defer access to the communication medium (e.g., air) and not access that channel, at least for some time. Alternatively, if a wireless communication device does not receive, detect, or 'hear' a signal above a given level (e.g., if it is below that level), then the wireless communication device can access the communication medium (e.g., air) and can access at least one channel to make a transmission. Generally, such operations determine if a channel is clear or not clear.

FIG. 2 is a diagram illustrating an embodiment 200 of a number of wireless communication devices, some operative as smart meter stations (SMSTAs). The SMSTA are implemented in various locations in an environment including a building or structure. Some wireless communication devices may be implemented to support communications associated with monitoring and/or sensing of any of a variety of different conditions, parameters, etc. Such wireless communication devices provide such sensed/monitored information to one or more other wireless communication devices (e.g., from the SMSTAs to an AP).

A SMSTA has communication functionality similar to a wireless station (STA) and is also operative to perform communication of monitoring and/or sensing related information. In certain applications, such devices may operate only very rarely. For example, when compared to the periods of time in which such a device is in power savings mode (e.g., a sleep mode, a reduced functionality operational mode a lowered power operational mode, etc.), the operational periods of time may be miniscule in comparison (e.g., only a few percentage of the periods of time in which the device is in such a power savings mode).

An SMSTA may awaken from such a power savings mode only to perform certain operations. For example, such a device may awaken from such a power savings mode to perform sensing and/or measurement of one or more parameters, conditions, constraints, etc. During such an operational period (e.g., in which the device is not in a power savings mode), the device may transmit such information to another wireless communication device (e.g., an access point (AP), another SMSTA, a wireless station (STA), or such an SMSTA or STA operating as an AP, etc.).

In an SMSTA environment, multiple respective wireless communication devices (e.g., SMSTAs) can be implemented to forward monitoring and/or sensing related information to one particular wireless communication device that operates as a manager, coordinator, etc. such as may be implemented by an access point (AP) or a wireless station (STA) operating as an AP. Such SMSTAs may be implemented to perform any of a number of data forwarding, monitoring and/or sensing operations. For example, in the context of a building or structure, there may be a number of services that are provided to that building or structure, including natural gas service, electrical service, television service, Internet service, etc. Alternatively, different respective monitors and/or sensors may be implemented throughout the environment to perform monitoring and/or sensing related to parameters not specifically related to services. As some examples, motion detection, door ajar detection, temperature measurement (and/or other atmospheric and/or environmental measurements), etc. may be performed by different respective monitors and/or sensors implemented in various locations and for various purposes. Communications from SMSTAs may be very important and yet performed quite infrequently. When communications from SMSTAs are not received by the manager, coordinator, etc. wireless communication device, one or more systems that use such monitoring and/or sensing information suffer performance degradation.

Any one of the devices within such an embodiment 200 may be implemented to perform processing the one or more received packets to determine status of one or more channels and to use one or more CCA levels to determine status of the one or more channels. Based on the determined status of the one or more channels, the device may then select at least one of those channels for use in supporting communications with one or more other devices and also then selectively direct when to support those communications based on the determined status of one or more channels.

FIG. 3A is a diagram illustrating an example 301 of communication between wireless communication devices. A wireless communication device 310 (e.g., which may be any one of devices 118-132 as with reference to FIG. 1) is in communication with another wireless communication device 390 via a transmission medium. The wireless communication device 310 includes a communication interface 320 to perform transmitting and receiving of one or more frames (e.g., using a transmitter 322 and a receiver 324). The wireless communication device 310 also includes a processor 330, and an associated memory 340, to execute various operations including generating and/or interpreting one or more frames, packets, signals, etc. transmitted to wireless communication device 390 and/or received from the wireless communication device 390 and/or wireless communication device 391. The wireless communication devices 310 and 390-391 may be implemented using one or more integrated circuits in accordance with any desired configuration or combination or components, modules, etc. within one or more integrated circuits. Also, the wireless communication devices 310, 390, and 391 may each include more than one antenna for transmitting and receiving of one or more frames (e.g., WDEV 310 may include one or more antennae, WDEV 390 may include m antennae, and WDEV 391 may include n antennae).

The communication interface 320 is configured to receive one or more packets and to support communications with one or more other wireless communication devices (e.g., devices 390-391). The processor 330 is configured to process the one or more packets to determine status of one or more channels within a predetermined frequency band using one or more clear channel assessment (CCA) levels that are selected based on a number of channels of the one or more channels and one or more bandwidths of the one or more channels. The processor 330 is also configured to select at least one channel of the one or more channels based on the determined status of the one or more channels. The processor 330 is also selectively configured to direct when the communication interface 320 supports the communications with the one or more other wireless communication devices (e.g., devices 390-391) on the selected at least one channel based on the determined status of the one or more channels.

The processor 330 within the device may also be configured to process the one or more packets to determine certain characteristics of those one or more packets, and then select the one or more CCA levels based on those characteristics. For example, the processor 330 may process the one or more packets to determine the number of channels within the one or more channels, the one or more bandwidths of those one or more channels, a rate at which the one or more packets is received, one or more modulation coding sets (MCSs) of the one or more packets, etc. and then select the one or more CCA levels based on any one or more of those determine characteristics. In addition, when two or more channels are implemented within one or more predetermined frequency bands, the processor 330 may select a CCA level based on the particular channel via which the one or more packets are received. For example, when a packet is received via a first channel, the processor 330 may use a first CCA level to determine status of that first channel. Alternatively, when a packet is received via a second channel, the processor 330 may use a second CCA level to determine status of the second channel. The various channels may be implemented within different frequency bands or different frequency sub-bands that may have different sizes. For example, a first channel may be located within a first frequency sub-band that is of a different size (e.g., wider or narrower) this than a second channel that is located within the second frequency sub-band. In addition, a given channel may be formed using two or more channels, such as in a bonded channel configuration in which two adjacent channels are combined to form the bonded channel. Alternatively, two or more non-adjacent channels may be combined to form another channel.

FIG. 3B is a diagram illustrating an example 302 of operation of one or more wireless communication devices. Device 310 is configured to perform CCA to determine when access to the communication medium may be made so that it may make one or more transmissions to one or more other devices, such as devices 390-391. In this diagram, device 310 detects or receives no packets from devices 390-391. There may be times during which device 310 detects no energy and receives no packets, and device 310 may then support communications using any desired channel.

FIG. 3C is a diagram illustrating another example 303 of operation of one or more wireless communication devices. In this diagram, device 310 detects or receives first packets from device 390 and may also detect and receive second packets from device 391. The device 310 processes the first packets received from device 390 using one or more CCA levels that are selected based on a number of channels and the number of bandwidths of those channels via which the first packets are received. Generally, the partitioning of one or more frequency bands into one or more channels may be described as channelization. A given frequency band may have different channelizations at different times. By determining a channel and bandwidth of the channel via which a packet is received, the device 310 may determine the channelization of the predetermined frequency band. For example, by firstly determining such information of the received packet, the device may secondly determine the overall channelization of the predetermined frequency band. Then, the device 310 may select the one or more CCA levels based on that information.

FIG. 3D is a diagram illustrating another example 304 of operation of one or more wireless communication devices. In this diagram, device 310 selects at least one of the one or more channels based on the determined status of the one or more channels and selectively supports communications with device 390 by transmitting third packets to device 390. Device 310 may also be configured to select at least one of the one or more channels based on the determined status of the one or more channels and selectively supports communications with device 391 by transmitting fourth packets to device 391. In some instances, the same at least one channel may be used to support communications with both devices 390-391. Also, in some instances, device 310 may transmit the same packets to both devices 390-391. Generally speaking, when status of at least one of the one or more communication channels is deemed acceptable, such as when any packet or signal is detected received that has an energy, signal, or power level (or other measurand or parameter) that is below a corresponding CCA level, then device 310 may select that at least one channel to support communications with at least one of the devices 390-391.

Figure 4:
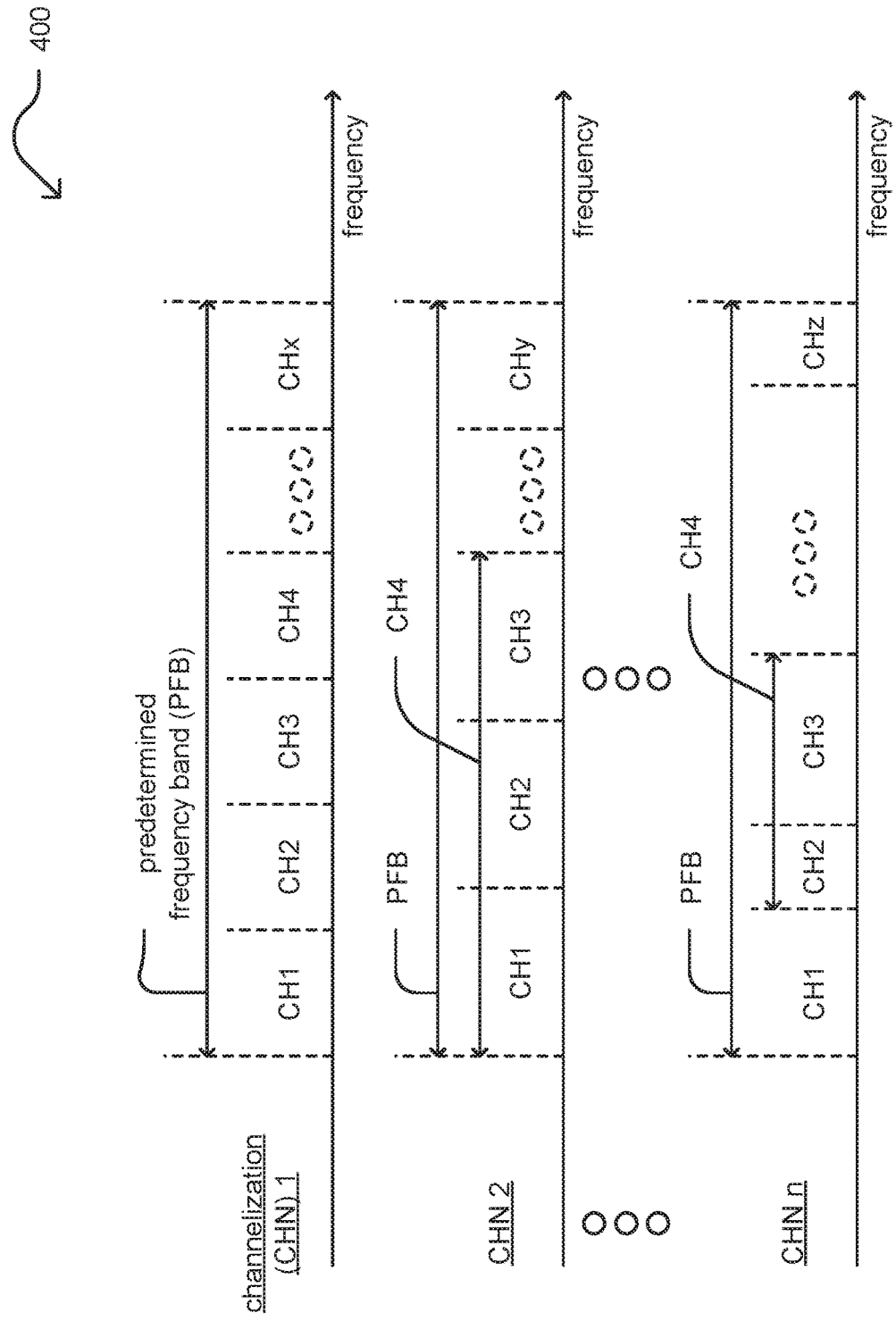
FIG. 4 is a diagram illustrating an example of a frequency band partitioned into a number of channels.

FIG. 4 is a diagram illustrating an example 400 of a frequency band partitioned into a number of channels. A predetermined frequency band (PFB) may be partitioned into different numbers of channels of different sizes at different times based on different channelizations. At the top of the diagram, a first channelization (CHN 1) shows the PFB as including a number 'x' channels each having a common size or bandwidth. Below, a second channelization (CHN 2) shows the PFB as including a number 'y' channels each having a common size or bandwidth that are relatively wider than the 'x' channels of CHN 1.

At the bottom of diagram, an n-th channelization (CHN n) shows the PFB as including a number 'z' channels. These channels are of non-uniform/different sizes or bandwidths. In addition, at least one of the channels, channel 4 (CH4), is shown as being formed from channels 2 and 3 in a bonded channel configuration such that channel 4 has the size or bandwidth of channels 2 and 3 combined.

As can be seen, the PFB can be partitioned into one or more channels. Then, one or more CCA levels may be selected based on the particular channelization that is detected and determined. In one example, a channelization may include one singular channel that spans the entire PFB. In another example, the PFB may be partitioned into 2 channels that together span the predetermined frequency band. Generally speaking, a PFB may be partitioned into any desired number of channels of any desired sizes or bandwidths, and the channel widths need not be of uniform size. Also, more than one PFB may be partitioned into the one or more channels, and such two or more PFBs may be adjacently located or non-adjacent to one another such that they are located in different portions of the frequency spectrum. In one example, such one or more PFBs may be included within frequency bands below 1 GHz excluding the TV White Space bands, with a transmission range up to 1 km and a minimum data rate of at least 100 Kb/s.

Generally, different channelizations may be used based on any one or more criteria including one or more communication protocols being used, one or more remote and/or local operating conditions of various devices within a system, etc. A device may switch between different channelizations adaptively based on any such criteria. When a packet is received via a given channel, the receiving device may be configured to assess the one or more channels on which the packet has been transmitted and then will be able to determine the channelization of the one or more PFBs. Based on such determine information related to the number of channels and bandwidths of those channels, the device may then be configured to select one or more CCA levels to determine status of those one or more channels. Different CCA levels may be selected depending on which channel the packet is received, the bandwidth of that channel, and the overall channelization of the PFB. Within any given channelization, certain of the channels may have particular designations, such as primary, secondary, and/or other designations.

Figure 5:
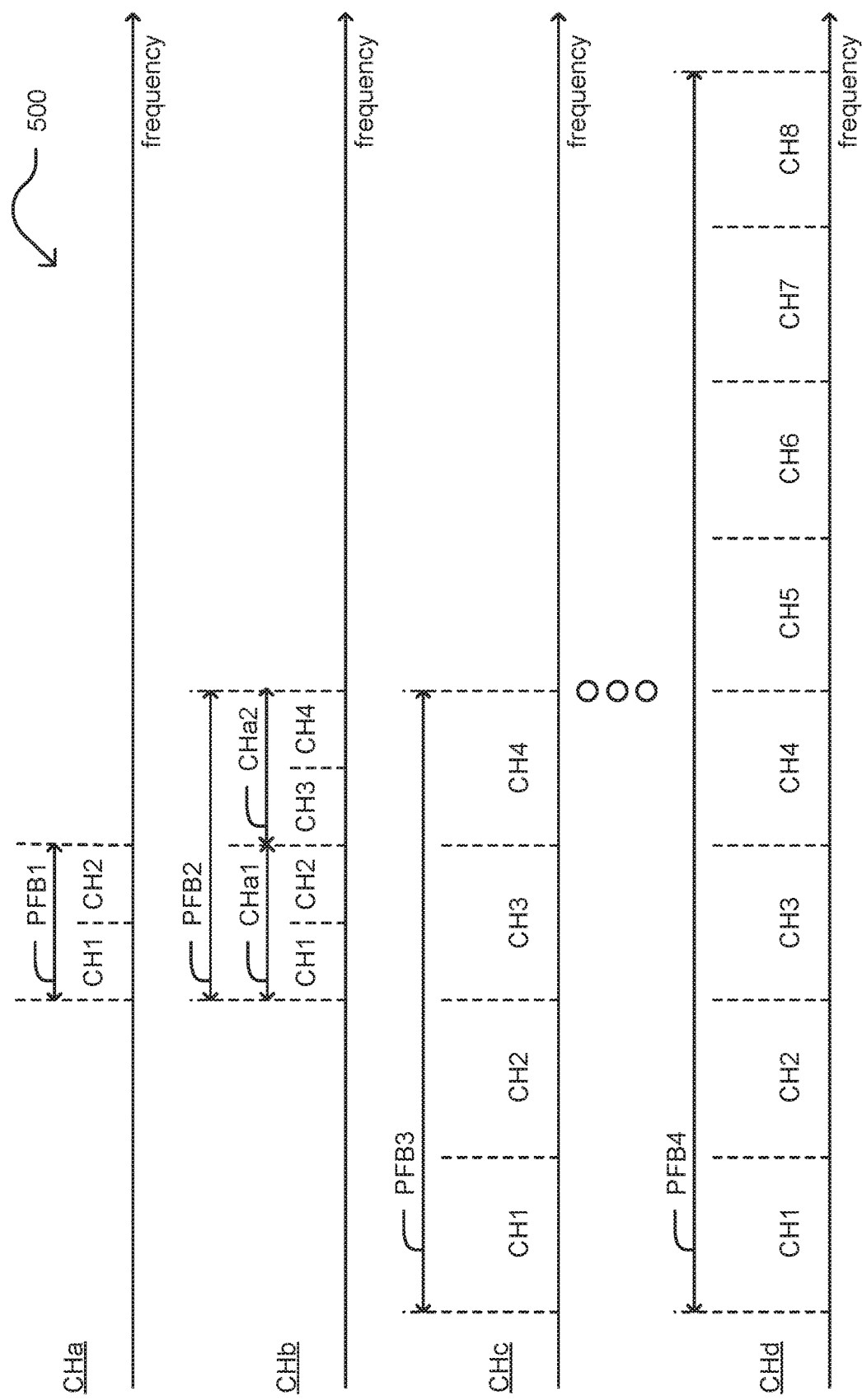
FIG. 5 is a diagram illustrating an example of different frequency bands partitioned into different numbers of channels.

FIG. 5 is a diagram illustrating an example 500 of different frequency bands partitioned into different numbers of channels. This diagram shows different respective predetermined frequency bands that are partitioned differently with respect to different channelizations. In this diagram, some of the frequency bands occupy similar portions of the frequency spectrum as others, yet different frequency bands may be located such that they occupy entirely non-overlapping portions of the frequency spectrum.

In a first channelization (CHa), two adjacent channels of similar bandwidth are included within a first predetermined frequency band (PFB1). The entirety of the first predetermined frequency band may be 2 MHz, and each of the two adjacent channels therein may be of 1 MHz bandwidth. One of the channels may be designated as a primary channel, and the other may be designated as a secondary channel.

In a second channelization (CHb), four adjacent channels of similar bandwidth are included within a second predetermined frequency band (PFB2) that also occupies a common portion of the frequency spectrum occupied by the first predetermined frequency band (PFB1). The entirety of the second predetermined frequency band may be 4 MHz, and each of the four channels therein may be of 1 MHz bandwidth. In addition to or alternatively, two adjacent channels (Cha1 and Cha2) of similar bandwidth (e.g., 2 MHz) are included within a second predetermined frequency band (PFB2). In this alternative example, the two adjacent channels (Cha1 and Cha2) may each be viewed as formed using two of the four channels (e.g., Cha1 formed using CH1 and CH2, and Cha2 formed using CH3 and CH4) such as in a bonded channel configuration. In one possible implementation, one of the channels may be designated as a primary channel, and the other may be designated as a secondary channel.

In a third channelization (CHc), four adjacent channels of similar bandwidth are included within a third predetermined frequency band (PFB3) that occupies those portions of the frequency spectrum occupied by the first and second predetermined frequency bands (PFB1 and PFB2) and additional frequency spectra. The entirety of the third predetermined frequency band may be 8 MHz, and each of the four adjacent channels therein may be of 2 MHz bandwidth. One of the channels may be designated as a primary channel, and the other may be designated as a secondary channel.

In a fourth channelization (CHd), eight adjacent channels of similar bandwidth are included within a fourth predetermined frequency band (PFB4) that occupies those portions of the frequency spectrum occupied by the first, second, and third predetermined frequency bands (PFB1, PFB2, and PFB3) and additional frequency spectra. The entirety of the fourth predetermined frequency band may be 16 MHz, and each of the four adjacent channels therein may be of 2 MHz bandwidth. One of the channels may be designated as a primary channel, and the other may be designated as a secondary channel.

Figure 6:
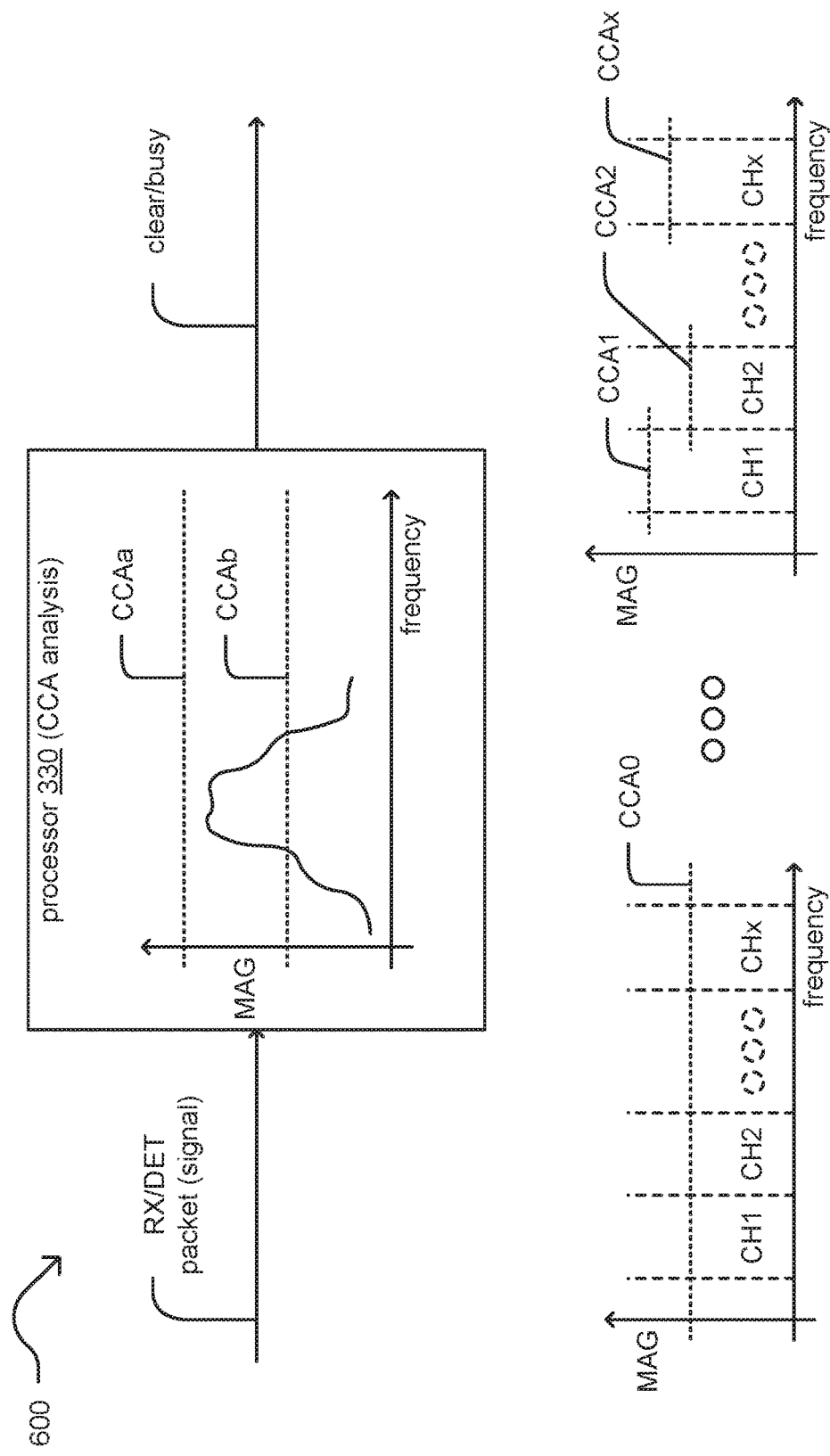
FIG. 6 is a diagram illustrating an example of clear channel assessment (CCA) analysis as may be performed within a processor of a wireless communication device.

FIG. 6 is a diagram illustrating an example 600 of clear channel assessment (CCA) analysis as may be performed within a processor of a wireless communication device. This diagram shows an example of processor 330 performing CCA analysis. Processor 330 is configured to process a received packet or signal to determine whether or not the energy, signal, or power level (or other measurand and/or parameter) of the received packet or signal is above one or more CCA levels. This example shows two separate CCA levels to which a given measurand and/or parameter may be compared. In other implementations, one or three or more CCA levels may be used. When the measurand and/or parameter is greater than a given CCA level, the processor 330 generates a busy indication based on that CCA level. Alternatively, when the measurand and/or parameter is less than a given CCA level, the processor 330 generates a clear indication based on that CCA level. If the measurand and/or parameter is exactly the same as a given CCA level, the processor 330 may be configured to generate either a clear or busy indication depending on a desired implementation.

At the bottom left of the diagram, a singular CCA level (CCA0) is shown for use across a wide range of the frequency spectrum. The processor 330 is configured to selective the same CCA level (CCA0) for use to process packets received via any of the channels one through x (CH1-CHx).

At the bottom right of the diagram, multiple CCA levels are shown for use across a various channels within the frequency spectrum. For example, the processor 330 is configured to select a first CCA level (CCA1) for use to process packets received via a first channel (CH1). The processor 330 is also configured to select a second CCA level (CCA2) for use to process packets received via a second channel (CH2). Generally, the processor 330 is configured to select different respective CCA levels for use to process packets received via different respective channels.

The processor 330 may be configured to adapt its operation among a singular CCA level operational modes and one or more multiple CCA level operational modes. For example, based on one or more remote and/or local operating conditions, the processor 330 may operate using a selected CCA level operational mode over others. Then, based on a change of any of the one or more remote and/or local operating conditions, the processor 330 may operate using a different selected CCA level operational mode. In one example of operation, a frequency band is partitioned into two separate portions such that one or more first channels are included within a first portion and one or more second channels are included within the second portion, and the processor 330 is configured to use a first CCA level to process packets received via the one or more first channels and a second CCA level to process packets received via the one or more second channels.

An energy detect (ED) level may be used to perform clear channel assessment (CCA). The ED level may be set at −62 dBm for 20 MHz waveforms. The ED level may be scaled with respect to bandwidth (e.g., increase as bandwidth increases). Note that some embodiments may consider the number of available channels, while others may not take into account the number of available channels. For example, in a 2.4 GHz implementation, a basic services set (BSS) can move to one of three channels if higher than −62 dBm interference exists in a given channel (e.g., this level is 20 dB higher than that used for preamble detection). However, such operation may be in a different frequency band.

Such operation may also take into account the total available bandwidth. For example, some implementations in the USA used three 8 MHz channels. Some implementations in Korea use three 2 MHz channels. These are similar to the channelization of 2.4 GHz three 20 MHz channels. For example, if the level is above this, it is assumed that the channel is busy; if such a signal is detected at all times, then the wireless communication device can move to another channel. Therefore, −62 dBm may be used for 8 MHz in the USA and 2 MHz in Korea and similarly in other countries. However, this approach may not adequately compensate for the improved propagation and it also creates different levels for the same bandwidth in different countries.

Such operation may also take into account interference with Zigbee (IEEE 802.15.4) based on certain bandwidth considerations. For example, Zigbee uses 5 MHz channelization in 2.4 GHz and 2 MHz channelization in 900 MHz. As such, a 20 MHz WiFi signal interferes with 4 Zigbee channels in 2.4 GHz and an 8 MHz WiFi signal interferes with 4 Zigbee signals in 900 MHz. A wireless communication device configured to use the same level of −62 dBm for 20 MHz in 2.4 and 8 MHz in 900 may sometimes lead to the same protection of 4 Zigbee channels but at greater distance in 900 MHz.

Also, a wireless communication device may be configured to consider interference with Zigbee (IEEE 802.15.4) based on certain rate considerations. For example, Zigbee's bit rate is 40 kbps in 900 MHz with specification sensitivity: −92 dBm and 250 kbps in 2.4 GHz with specification sensitivity −85 dBm. The 7 dB improved sensitivity at 900 MHz allows for deferral at a 7 dB higher power and use −62+7=−55 dBm/20 MHz, or equivalently −62 dBm/4 MHz. This gives a bandwidth ratio of 5 equivalent to 7 dB.

A wireless communication device can be configured to perform CCA differently for primary and secondary channels. For example, a wireless communication device can be configured to perform preamble detection using a first CCA level or a primary channel level. A level of −82 dBm may be used for 20 MHz, and this will provide a 20 dB difference from −62 dBm that is used for energy detect (ED) level). A wireless communication device can be configured to ignore packets detected below −82 dBm.

A similar 20 dB difference between ED level and preamble detection level may be employed for different channelizations. For example, −82 dBm may be used for 4 MHz channelization, −85 dBm may be used for 2 MHz channelization, −91 dBm may be used for 1 MHz channelization, −79 dBm may be used for 8 MHz channelization, and −76 dBm may be used for 16 MHz channelization. As such, a wireless communication device can be configured to ignore packets detected those levels.

Similarly, to the discussion above for CCA levels for primary channel detection, a wireless communication device may be configured to use a detection level on a secondary 20 MHz signal that is the midpoint between the detection level on the primary channel and the ED detection level. For example, considering the ED level for 2 MHz channels is −65 dBm and the primary channel detection level for 2 MHz channel is −85 dBm, a wireless communication device may be configured to perform detection on a secondary 2 MHz channel of 1 MHz or 2 MHz waveform using at a level −75 dBm.

With respect to the selectivity of one or more CCA levels based on one or more criteria, note that selectivity of one or more CCA levels may be made based on category or type of wireless communication device. For example, a high elevation access point (AP) (e.g., an AP implemented in a relatively high elevation compared to other wireless communication devices in the system) may present uniquely challenging situations due to topology issues compounded by the improved sensitivity and propagation of signals less than 1 GHz frequencies. As an example, any transmission by such a high elevation AP causes interference to wireless communication devices within overlapping basic services sets (OBSSs). As such, some wireless communication devices may be configured to relax CCA levels only for hose such APs (e.g., such as High Elevation AP) by 10 dB. That means that the 2 MHz primary channel level may be set at −75 dBm which is the secondary level for low elevation devices. Similarly, the secondary level is set at −65 dBm which is the ED level for low elevation devices and the Ed level is set at −55 dBm.

As another example of selectivity of one or more CCA levels may be made based on category or type of wireless communication device, special rules may be used to select CCA levels for low power and/or battery operated wireless communication devices. As an example, certain low power battery operated devices (e.g., sensors or smart meter stations (SMSTAs)) may be configured to transmit around 0 dBm. As such, these devices create relatively less interference than others. For example, if a low power device hears a high power device transmitting at 15 dBm at a certain level (e.g., −70 dBm), then that device will hear the low power device at a much lower level (−85 dBm for a 0 dBm transmit power). Then, a wireless communication device may be configured to relax the CCA rules for low power battery operated devices transmitting at or around 0 dBm by 10 dB as well.

As another example of selectivity of one or more CCA levels may be made based on category or type of wireless communication device, special rules may be used to select CCA levels for wireless communication devices having a certain type of analog front end (AFE). For example, wireless communication devices configured to with a 1 MHz AFE are configured to operate in a 1 MHz BSS and may use a 1 MHz front end filter to improve rejection of transmissions in the adjacent channels. A wireless communication device that uses a 1 MHz front end filter can disable the ability to decode the 2 MHz signal field (SIG). This is somewhat similar to 4 MHz, 8 MHz, and 16 MHz transmissions that use a duplicated 2 MHz SIG field design. In such an instance, these waveforms do not use a duplicated 1 MHz SIG field. In order to decode a 2 MHz SIG field, a device may be configured to decode a 2 MHz signal.

A wireless communication device can include a 1 MHz front end filter and then will not be able to decode the 2 MHz SIG field using a CCA level for a detected 2 MHz signal. Such a wireless communication device may be configured to use a CCA level of 91 dBm for 1 MHz. If a wireless communication device with a 1 MHz front-end filter detects a 2 MHz signal but cannot decode the 2 MHz SIG field, the wireless communication device employs a CCA level of −91 dBm. Such a wireless communication device may be configured to avoid large asymmetry between the CCA rules of 2 MHz devices that can always decode the SIG field of 1 MHz devices.

It is noted that such specific levels presented herein are exemplary, and different respective specific values may alternatively be employed in various instances. For example, the principle of relaxation of respective clear channel assessment (CCA) values employed for a High Elevation AP may be effectuated using a different specific value than a relaxation of specifically 10 dB (e.g., 5 dB relaxation, 8 dB relaxation, etc. or generally X dB relaxation [where X is a selected number] may be employed). Similarly, the principle of relaxation of respective clear channel assessment (CCA) values employed for a low power and/or battery operated devices may be effectuated using a different specific value that a relaxation of specifically transmitting at or around 0 dBm by 10 dB (e.g., 5 dB relaxation, 8 dB relaxation, etc. or generally X dB relaxation [where X is a selected number] may be employed).

Figures 7A, 7B:
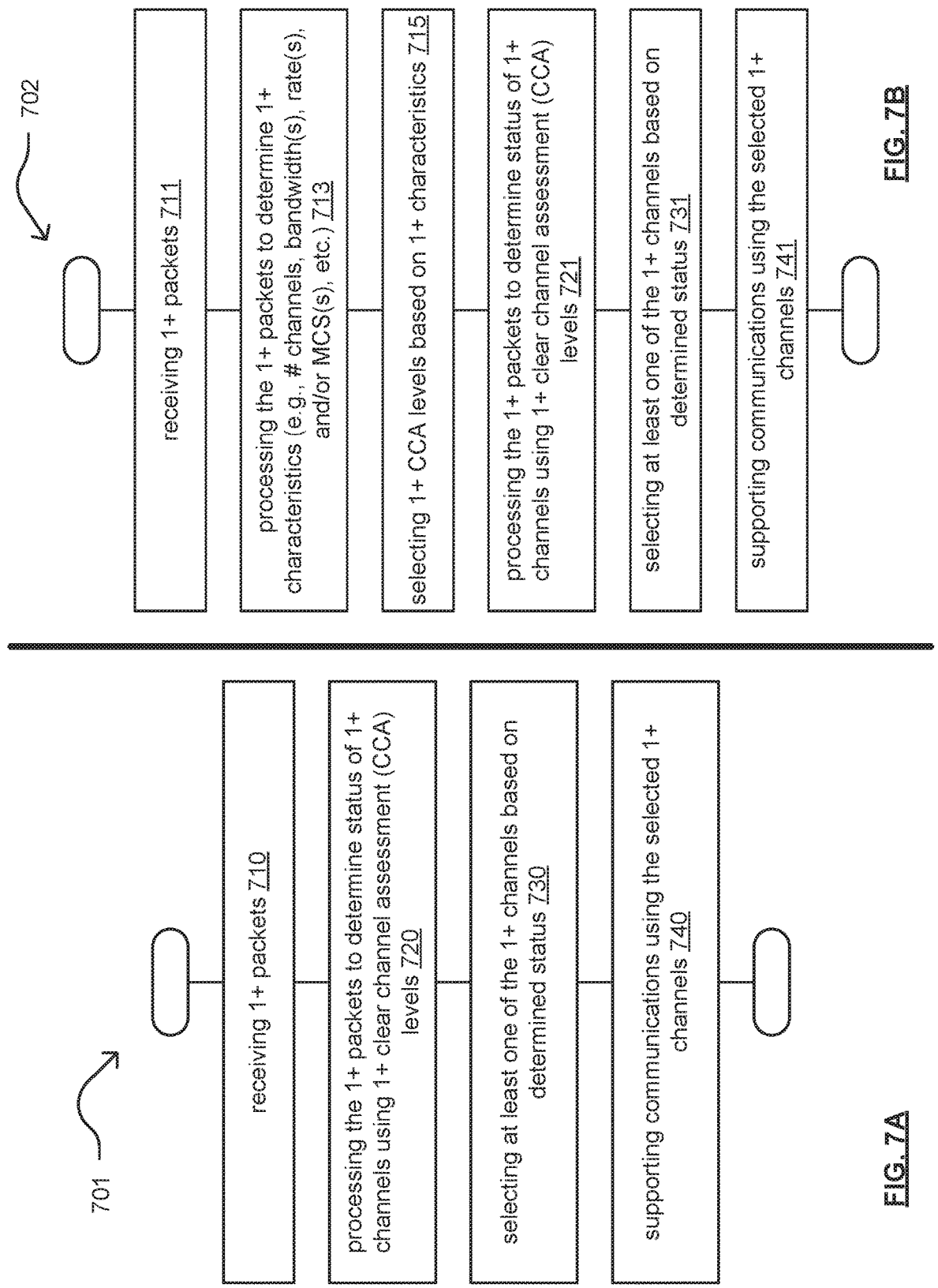
FIG. 7A is a diagram illustrating an embodiment of a method for execution by one or more wireless communication devices.
FIG. 7B is a diagram illustrating another embodiment of a method for execution by one or more wireless communication devices.

FIG. 7A is a diagram illustrating an embodiment of a method 701 for execution by one or more wireless communication devices. The method 701 begins by receiving one or more packets (e.g., via a communication interface of a wireless communication device) (block 710). Then, the method 701 continues by processing the one or more packets to determine status of one or more channels within a predetermined frequency band using one or more clear channel assessment (CCA) levels that are selected based on a number of channels of the one or more channels and one or more bandwidths of the one or more channels (block 720).

The method 701 then operates by selecting at least one channel of the one or more channels based on the determined status of the one or more channels (block 730). The method 701 continues by supporting communications with one or more other wireless communication devices using the selected at least one channel during one or more times based on the determined status of the one or more channels (block 740).

FIG. 7B is a diagram illustrating another embodiment of a method 702 for execution by one or more wireless communication devices. The method 702 begins by receiving one or more packets (e.g., via a communication interface of a wireless communication device) (block 711).

The method 702 continues by processing the one or more packets to determine one or more characteristics thereof (block 713). Examples of some characteristics of the one or more packets may include any one of a number of channels via which the one or more packets have been received, one or more bandwidths of the one or more channels, one or more rates via which the one or more packets are received (such as a data rate, symbol rate, transmission rate, etc.), one or more modulation coding sets (MCSs) of the one or more packets, and/or any other desired characteristic.

The method 700 then operates by selecting the one or more CCA levels based on the one or more characteristics (block 715). In one example, the one or more CCA levels are selected based on the number of channels of the one or more channels, the one or more bandwidths of the one or more channels, and the rate at which the one or more packets is received.

Then, the method 702 continues by processing the one or more packets to determine status of one or more channels within a predetermined frequency band using one or more CCA levels that are selected based on a number of channels of the one or more channels and one or more bandwidths of the one or more channels (block 721).

The method 702 then operates by selecting at least one channel of the one or more channels based on the determined status of the one or more channels (block 731). The method 702 continues by supporting communications with one or more other wireless communication devices using the selected at least one channel during one or more times based on the determined status of the one or more channels (block 741).

FIG. 8A is a diagram illustrating another embodiment of a method 801 for execution by one or more wireless communication devices. The method 801 operates by selecting first one or more channels based on determined status of at least one of the first one or more channels (block 810). The status of these first one or more channels is determined using first one or more CCA levels. Then, the method 801 continues by supporting communications using those selected first one or more channels (block 820). The operations of the blocks 810 and 820 may be viewed as being performed at or during a first time.

The method 801 may optionally perform a number of analogous operations as performed in the blocks 810 and 820 with respect to selecting and supporting communications using second selected one or more channels, and/or third selected one or more channels, etc.

The method 801 then continues by selecting n-th one or more channels based on determined status of at least one of the n-th one or more channels (block 830). The status of these n-th one or more channels is determined using n-th one or more CCA levels. Then, the method 801 continues by supporting communications using those selected n-th one or more channels (block 840). The operations of the blocks 830 and 840 may be viewed as being performed at or during an n-th time (which may be a second time, a third time, a fourth time, etc.).

FIG. 8B is a diagram illustrating another embodiment of a method 802 for execution by one or more wireless communication devices. The method 802 operates by receiving one or more packets (block 811). The method 802 continues by processing the received one or more packets to determine status of one or more channels using one or more clear channel assessment (CCA) levels (block 821).

If the status of at least one of the one or more channels compares favorably to at least one criterion indicating that the channel is clear (block 831), then the method 802 continues by selecting at least one of the one or more channels indicated as clear based on the determined status (block 841). Then, the method 802 operates by supporting communications with one or more other wireless communication devices using the selected at least one channel (block 851).

Alternatively, if the status of at least one of the one or more channels fails to compare favorably to at least one criterion indicating that the channel is clear (block 831), then the method 802 may continue by receiving an additional one or more packets (block 811). Generally, determination is made whether or not one or more channels is available for use in supporting communications. When no channels are determined as being clear are available, then the method 802 operates by not supporting any communications. In such a situation, a number of operations may be performed including performing a timeout, a backup, or some other operation to wait a period of time, which may be a predetermined period of time or and adaptively determined period of time, after which the method 802 may perform additional operations to determine status of the one or more channels and their capability to support communications.

It is noted that the various operations and functions described within various methods herein may be performed within a wireless communication device (e.g., such as by the processor 330, communication interface 320, and memory 340 as described with reference to FIG. 3A) and/or other components therein. Generally, a communication interface and processor in a wireless communication device can perform such operations.

Examples of some components may include one of more baseband processing modules, one or more media access control (MAC) layer components, one or more physical layer (PHY) components, and/or other components, etc. For example, such a processor can perform baseband processing operations and can operate in conjunction with a radio, analog front end (AFE), etc. The processor can generate such signals, frames, etc. as described herein as well as perform various operations described herein and/or their respective equivalents.

In some embodiments, such a baseband processing module and/or a processing module (which may be implemented in the same device or separate devices) can perform such processing to generate signals for transmission to another wireless communication device using any number of radios and antennae. In some embodiments, such processing is performed cooperatively by a processor in a first device and another processor within a second device. In other embodiments, such processing is performed wholly by a processor within one device.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments of an invention have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The one or more embodiments are used herein to illustrate one or more aspects, one or more features, one or more concepts, and/or one or more examples of the invention. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module includes a processing module, a processor, a functional block, hardware, and/or memory that stores operational instructions for performing one or more functions as may be described herein. Note that, if the module is implemented via hardware, the hardware may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure of an invention is not limited by the particular examples disclosed herein and expressly incorporates these other combinations.

What is claimed is:

1. A wireless communication device comprising:
a communication interface; and
processing circuitry that is coupled to the communication interface, wherein at least one of the communication interface or the processing circuitry configured to:
receive a packet from a first other wireless communication device that supports communications with the wireless communication device and a second other wireless communication device via a communication channel that includes a plurality of sub-bands;
process first information received within a first sub-band of the communication channel using a first clear channel assessment (CCA) level to determine status of the first sub-band of the communication channel;
when the status of the first sub-band of the communication channel compares favorably to at least one criterion indicating that the first sub-band of the communication channel is available:
select the first sub-band of the communication channel; and
support subsequent communication between the wireless communication device and the first other wireless communication device using the first sub-band of the communication channel; and
when the status of the first sub-band of the communication channel compares unfavorably to the at least one criterion indicating that the first sub-band of the communication channel is available, waiting a period of time and after the period of time, processing other information that is received within the first sub-band of the communication channel using a particular CCA level to determine status of the first sub-band of the communication channel.

2. The wireless communication device of claim 1, wherein the at least one of the communication interface or the processing circuitry is further configured to:
receive another packet from the first other wireless communication device that supports communications with the wireless communication device and the second other wireless communication device via the communication channel that includes the plurality of sub-bands;
process other information received within the first sub-band of the communication channel using a second CCA level to determine other status of the first sub-band of the communication channel; and
when the other status of the first sub-band of the communication channel compares favorably to the at least one criterion indicating that the first sub-band of the communication channel is available:
select the first sub-band of the communication channel; and
support other subsequent communication between the wireless communication device and the first other wireless communication device using the first sub-band of the communication channel.

3. The wireless communication device of claim 1, wherein the at least one of the communication interface or the processing circuitry is further configured to:
when the status of the first sub-band of the communication channel compares unfavorably to the at least one criterion indicating that the first sub-band of the communication channel is available, wait a period of time and after the period of time, process other information that is received within the first sub-band of the communication channel using the first CCA level to determine status of the first sub-band of the communication channel.

4. The wireless communication device of claim 1, wherein the at least one of the communication interface or the processing circuitry is further configured to:
when the status of the first sub-band of the communication channel compares unfavorably to the at least one criterion indicating that the first sub-band of the communication channel is available, wait a period of time and after the period of time, process other information that is received within the first sub-band of the communication channel using a second CCA level to determine status of the first sub-band of the communication channel.

5. The wireless communication device of claim 1, wherein the at least one of the communication interface or the processing circuitry is further configured to:
process the packet that is received from the first other wireless communication device, wherein the packet includes the first information that is intended for the wireless communication device within the first sub-band of the communication channel and second information that is intended for the second other wireless communication device within a second sub-band of the communication channel;
determine at least one of a number of sub-bands of the plurality of sub-bands of the communication channel or bandwidths of the plurality of sub-bands of the communication channel;
select at least one of the first CCA level or a second CCA level based on the at least one of the number of sub-bands of the plurality of sub-bands of the communication channel or the bandwidths of the plurality of sub-bands of the communication channel; and
at least one of process the first information received within the first sub-band of the communication channel using the first CCA level to determine status of the first sub-band of the communication channel or process the second information received within the second sub-band of the communication channel using the second CCA level to determine other status of the second sub-band of the communication channel.

6. The wireless communication device of claim 1, wherein the at least one of the communication interface or the processing circuitry is further configured to:
receive the packet from the first other wireless communication device, wherein the packet includes the first information that is intended for the wireless communication device within the first sub-band of the communication channel and second information that is intended for the second other wireless communication device within a second sub-band of the communication channel;
process the first information received within the first sub-band of the communication channel using the first CCA level to determine the status of the first sub-band of the communication channel and the second information received within the second sub-band of the communication channel using a second CCA level to determine other status of the second sub-band of the communication channel;
generate a first clear or busy indication based on the status of the first sub-band of the communication channel; and
generate a second clear or busy indication based on the other status of the second sub-band of the communication channel.

7. The wireless communication device of claim 1 further comprising:
a wireless station (STA), wherein the first other wireless communication device includes an access point (AP).

8. The wireless communication device of claim 1 further comprising:
a smart meter station (SMSTA), wherein the first other wireless communication device includes an access point (AP).

9. A wireless communication device comprising:
a communication interface; and
processing circuitry that is coupled to the communication interface, wherein at least one of the communication interface or the processing circuitry configured to:
receive a packet from a first other wireless communication device, wherein the packet includes first information that is intended for the wireless communication device within a first sub-band of a communication channel and second information that is intended for a second other wireless communication device within a second sub-band of the communication channel;
process the first information received within the first sub-band of the communication channel using a first clear channel assessment (CCA) level to determine first status of the first sub-band of the communication channel and the second information received within the second sub-band of the communication channel using a second CCA level to determine second status of the second sub-band of the communication channel;
when the first status of the first sub-band of the communication channel compares favorably to at least one criterion indicating that the first sub-band of the communication channel is available:
select the first sub-band of the communication channel; and
support first subsequent communication between the wireless communication device and the first other wireless communication device using the first sub-band of the communication channel;
when the second status of the first sub-band of the communication channel compares favorably to the at least one criterion indicating that the second sub-band of the communication channel is available:
select the second sub-band of the communication channel; and
support second subsequent communication between the wireless communication device and the first other wireless communication device using the second sub-band of the communication channel;
when the first status of the first sub-band of the communication channel compares unfavorably to the at least one criterion indicating that the first sub-band of the communication channel is available, wait a first period of time and after the first period of time, process first other information that is received within the first sub-band of the communication channel using a first particular CCA level to determine status of the first sub-band of the communication channel; and
when the second status of the second sub-band of the communication channel compares unfavorably to the at least one criterion indicating that the second sub-band of the communication channel is available, wait a second period of time and after the second period of time, process second other information that is received within the second sub-band of the communication channel using a second particular CCA level to determine status of the second sub-band of the communication channel.

10. The wireless communication device of claim 9, wherein the at least one of the communication interface or the processing circuitry is further configured to:
when the first status of the first sub-band of the communication channel compares unfavorably to the at least one criterion indicating that the first sub-band of the communication channel is available, wait a first period of time and after the first period of time, process first other information that is received within the first sub-band of the communication channel using the first CCA level to determine status of the first sub-band of the communication channel; and when the second status of the second sub-band of the communication channel compares unfavorably to the at least one criterion indicating that the second sub-band of the communication channel is available, wait a second period of time and after the second period of time, process second other information that is received within the second sub-band of the communication channel using the second CCA level to determine status of the second sub-band of the communication channel.

11. The wireless communication device of claim 9, wherein the at least one of the communication interface or the processing circuitry is further configured to perform at least one of:

when the first status of the first sub-band of the communication channel compares unfavorably to the at least one criterion indicating that the first sub-band of the communication channel is available, wait a first period of time and after the first period of time, process first other information that is received within the first sub-band of the communication channel using a third CCA level to determine status of the first sub-band of the communication channel; or when the second status of the second sub-band of the communication channel compares unfavorably to the at least one criterion indicating that the second sub-band of the communication channel is available, wait a second period of time and after the second period of time, process second other information that is received within the second sub-band of the communication channel using a fourth CCA level to determine status of the second sub-band of the communication channel.

12. The wireless communication device of claim 9, wherein the at least one of the communication interface or the processing circuitry is further configured to:

process the packet to determine at least one of a number of sub-bands of a plurality of sub-bands of the communication channel or bandwidths of the plurality of sub-bands of the communication channel; and select at least one of the first CCA level or the second CCA level based on the at least one of the number of sub-bands of the plurality of sub-bands of the communication channel or the bandwidths of the plurality of sub-bands of the communication channel.

13. The wireless communication device of claim 9 further comprising:

a wireless station (STA) or a smart meter station (SM-STA), wherein the first other wireless communication device includes an access point (AP).

14. A method for execution by a wireless communication device, the method comprising:

receiving, via a communication interface of the wireless communication device, a packet from a first other wireless communication device that supports communications with the wireless communication device and a second other wireless communication device via a communication channel that includes a plurality of sub-bands;

processing first information received within a first sub-band of the communication channel using a first clear channel assessment (CCA) level to determine status of the first sub-band of the communication channel;

when the status of the first sub-band of the communication channel compares favorably to at least one criterion indicating that the first sub-band of the communication channel is available:
  selecting the first sub-band of the communication channel; and
  supporting subsequent communication, via the communication interface of the wireless communication device, between the wireless communication device and the first other wireless communication device using the first sub-band of the communication channel; and when the status of the first sub-band of the communication channel compares unfavorably to the at least one criterion indicating that the first sub-band of the communication channel is available, waiting a period of time and after the period of time, processing other information that is received within the first sub-band of the communication channel using a particular CCA level to determine status of the first sub-band of the communication channel.

15. The method of claim 14 further comprising:

receiving, via the communication interface of the wireless communication device, another packet from the first other wireless communication device that supports communications with the wireless communication device and the second other wireless communication device via the communication channel that includes the plurality of sub-bands;

processing other information received within the first sub-band of the communication channel using a second CCA level to determine other status of the first sub-band of the communication channel; and when the other status of the first sub-band of the communication channel compares favorably to the at least one criterion indicating that the first sub-band of the communication channel is available:
  selecting the first sub-band of the communication channel; and
  supporting other subsequent communication, via the communication interface of the wireless communication device, between the wireless communication device and the first other wireless communication device using the first sub-band of the communication channel.

16. The method of claim 14 further comprising:

when the status of the first sub-band of the communication channel compares unfavorably to the at least one criterion indicating that the first sub-band of the communication channel is available, waiting a period of time and after the period of time, processing other information that is received within the first sub-band of the communication channel using the first CCA level to determine status of the first sub-band of the communication channel.

17. The method of claim 14 further comprising:

when the status of the first sub-band of the communication channel compares unfavorably to the at least one criterion indicating that the first sub-band of the communication channel is available, waiting a period of time and after the period of time, processing other information that is received within the first sub-band of the communication channel using a second CCA level to determine status of the first sub-band of the communication channel.

18. The method of claim 14 further comprising:

processing the packet that is received from the first other wireless communication device, wherein the packet includes the first information that is intended for the wireless communication device within the first sub-band of the communication channel and second information that is intended for the second other wireless communication device within a second sub-band of the communication channel;

determining at least one of a number of sub-bands of the plurality of sub-bands of the communication channel or bandwidths of the plurality of sub-bands of the communication channel;

selecting at least one of the first CCA level or a second CCA level based on the at least one of the number of sub-bands of the plurality of sub-bands of the communication channel or the bandwidths of the plurality of sub-bands of the communication channel; and at least one of processing the first information received within the first sub-band of the communication channel using the first CCA level to determine status of the first sub-band of the communication channel or processing the second information received within the second sub-band of the communication channel using the second CCA level to determine other status of the second sub-band of the communication channel.

19. The method of claim 14 further comprising:

receiving, via the communication interface of the wireless communication device, the packet from the first other wireless communication device, wherein the packet includes the first information that is intended for the wireless communication device within the first sub-band of the communication channel and second information that is intended for the second other wireless communication device within a second sub-band of the communication channel;

processing the first information received within the first sub-band of the communication channel using the first CCA level to determine the status of the first sub-band of the communication channel and the second information received within the second sub-band of the communication channel using a second CCA level to determine other status of the second sub-band of the communication channel;

generating a first clear or busy indication based on the status of the first sub-band of the communication channel; and generating a second clear or busy indication based on the other status of the second sub-band of the communication channel.

20. The method of claim 14, wherein the wireless communication device includes a wireless station (STA) or a smart meter station (SMSTA), and the first other wireless communication device includes an access point (AP).

* * * * *